Oct. 11, 1960
R. I. R. DEAN
2,955,856
MOUNTING MEANS FOR HARD AND SOFT COMPONENTS
TO PREVENT RELATIVE ROTARY MOVEMENT
Filed Sept. 19, 1957
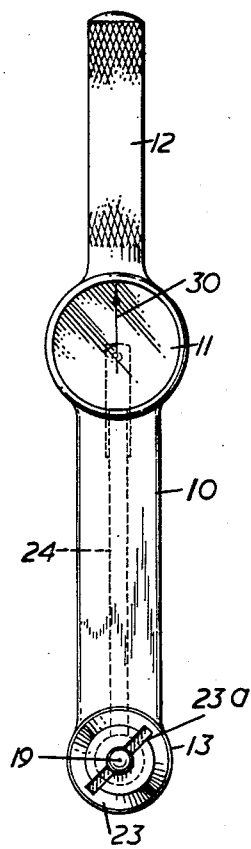
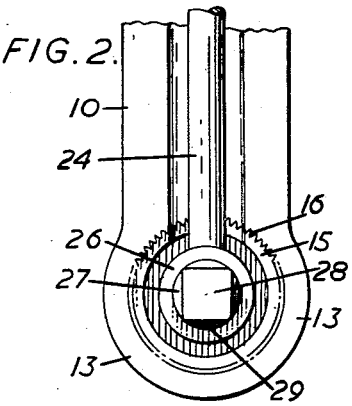
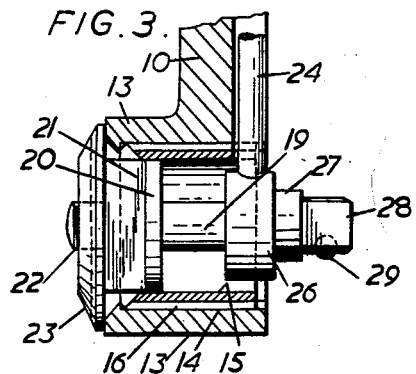
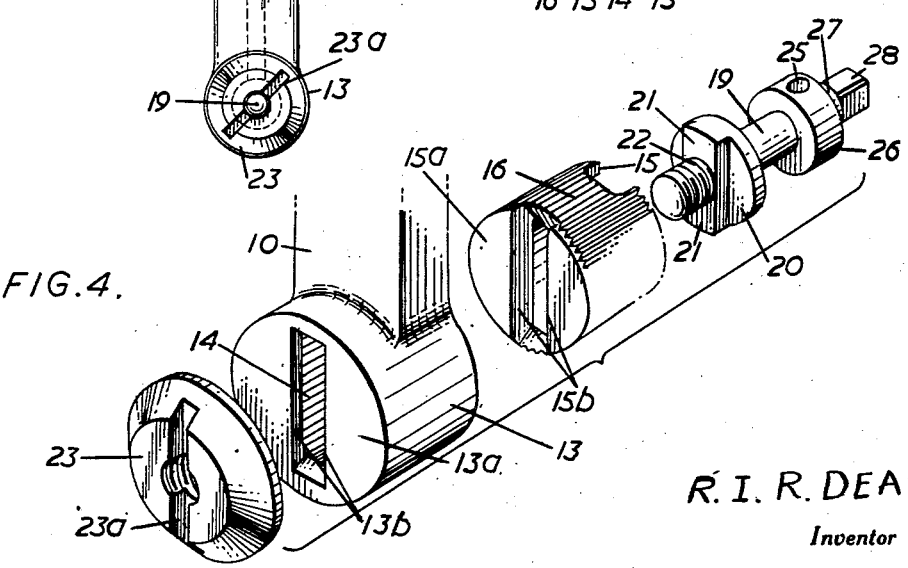
R. I. R. DEAN
Inventor
By William B Kex
Attorney

United States Patent Office 2,955,856
Patented Oct. 11, 1960

2,955,856

MOUNTING MEANS FOR HARD AND SOFT COMPONENTS TO PREVENT RELATIVE ROTARY MOVEMENT

Reginald Ivor Reid Dean, 14–16 Curzon St., Derby, Derbyshire, England

Filed Sept. 19, 1957, Ser. No. 684,999

4 Claims. (Cl. 287—119)

This invention relates to the mounting of hard and soft components in such a way as to prevent relative rotary movement between them.

For example, the invention may be applied to the fitting of a hard steel or similar inner member into an outer member of aluminium or other soft metal or alloy, or of a plastic material.

The object of the invention is to provide a means for mounting a hard component and soft one in intimate physical relationship so that the one will be securely mounted in or upon the other and so that they cannot work loose or turn relatively to each other.

A further object of the invention is to enable a hard steel or similar spindle or pin to be mounted within a soft metal or plastic housing in such a way that there can be no possibility of any rotational movement of the spindle or pin relative to the housing.

A further object of the invention is to mount the torque pin of a torque spanner in such a manner that the pin will not be able to turn slightly or work loose in its housing, which is fatal to the accuracy of the instrument.

A further object is to provide a simple and convenient way of mounting the parts to form the assembly of a torque pin or the like within its housing.

The invention will be described chiefly with reference to a torque spanner but it is to be understood that it is not restricted to this one application, as it may be useful in a variety of other devices or mechanisms where a similar difficulty is liable to arise.

The invention consists in forming a hard cylindrical member with splines along its outer surface and driving it into the bore of a softer housing or component designed to receive it, so that the hard splines cut into the soft bore and hold the hard cylindrical member against rotation.

Referring to the drawings which form a part of this specification:

Figure 1 is a front elevation of a torque spanner incorporating the invention.

Figure 2 is a part rear elevation of the torque spanner with the cover plate removed.

Figure 3 is a vertical section through Figure 2.

Figure 4 is an exploded perspective view showing the torque pin assembly.

Figures 2, 3 and 4 are drawn to a larger scale than Figure 1.

The instrument has an elongated hollow body 10 which carries an indicating dial 11 and has a handle 12. These parts are made of aluminium or other soft metal or metallic alloy, or a plastic. At the torque pin end of the housing a cylindrical hollow boss 13 is formed having an internal bore 14. A hard cylindrical sleeve 15 which may be made of a suitable grade of steel, has its external surface formed with splines 16 running along it. Both the boss 13 and the sleeve 15 have one end closed as shown at 13ª and 15ª respectively. The sleeve 15 is driven into the bore 14 of the boss 13 with its closed end 15ª leading, and the splines 16 cut their way along the bore 14 until the closed end 15ª of the sleeve abuts against the closed end 13ª of the boss 13. The sleeve 15 is now immovably mounted in the boss 13 and relative rotation between them cannot take place. A tool is now applied through the sleeve to cut a transverse slot at 15ᵇ and 13ᵇ in the closed ends of the sleeve 15 and boss 13. A torque pin 19 is provided with a flanged part 20 of larger diameter and the flanged part 20 has flats or shoulders 21 which fit closely into the slots 15ᵇ, 13ᵇ, leaving a short length of pin 19, formed with screw-threads 22, projecting beyond the slots to receive a capnut or end cover 23, which is grooved at 23ª on its outer face to facilitate the operations of tightening and releasing it. The torque pin is thus immovably fitted into the sleeve 15 and the main part of the pin is accessible within the sleeve for the connection to it of the usual torque lever or the like 24. This lever 24 fits into a hole 25 in another flanged part 26 of larger diameter on the torque pin 19. The rear end of the torque pin 19 is formed with another portion 27 of larger diameter than the main part of the pin but of smaller diameter than the flanges 20, 26, to suit the hole in the back closure plate which is removed in the drawings. The extreme end 28 of the torque pin projects through the back plate and is of square or similar shape to form the torque nut. It is fitted with a spring-loaded ball 29 on one face. A torque applied to this torque nut 28 is communicated by the torque pin 19 to the torque lever 24, whose consequent deflection is imparted through any suitable or conventional gearing with an indicating pointer 30 moving over a graduated scale in the dial 11.

I claim:

1. Mounting means for the torque pin of a torque spanner comprising a housing, a cylindrical hollow boss on the housing, the inner peripheral wall thereof defining a soft internal bore, said boss being closed at one end except for a non-circular central opening therethrough, a hard cylindrical sleeve seated within the soft internal bore, said sleeve having external splines thereon extending longitudinal thereof, the overall diameter of the sleeve and its splines being slightly greater than the internal diameter of the soft internal bore whereby the splines embed themselves in the soft bore when the sleeve is driven thereinto and said sleeve being closed at the end adjacent the closed end of the boss except for an opening corresponding to and registering with the opening in the end of the boss, and a torque pin mounted in said sleeve, said pin having a portion mating with and fitting into said openings and means on said portion and projecting beyond the openings for locking the pin in position whereby the torque pin is held against rotative movement relative to the housing.

2. A mounting means as claimed in claim 1 in which the openings are in the form of rectangular slots and the mating portion of the pin is correspondingly shaped to fit therein.

3. Mounting means for the torque pin of a torque spanner, comprising a torque pin, flanges on the torque pin, a hard hollow sleeve around the torque pin, splines on the external surface of the sleeve, a softer hollow boss around said sleeve and having a diameter slightly less than the combined diameter of the sleeve and its splines whereby the splines on the sleeve cut and embed themselves in the hollow boss, closed ends on the boss and the sleeve, except for a non-circular slot in each closed end in registration with each other, a shoulder on the torque pin corresponding in shape and size to the shape and size of said slots fitting into said slots, a central protection of the torque pin having a threaded end and projecting beyond the slots, a nut screwed on to said threaded end and a torque nut on the opposite end of the torque pin whereby the torque pin is held against rotative movement relative to the boss.

4. A mounting means as claimed in claim 3 in which the openings are in the form of rectangular slots and the mating portion of the pin is correspondingly shaped to fit therein.

References Cited in the file of this patent

UNITED STATES PATENTS

| | | |
|---|---|---|
| 1,490,649 | Vanderbeek | Apr. 15, 1924 |
| 2,441,624 | Elliott | May 18, 1948 |
| 2,586,096 | Schaal | Feb. 19, 1952 |
| 2,636,254 | Gunning | Apr. 28, 1953 |
| 2,686,963 | Freyssinet | Aug. 24, 1954 |
| 2,708,130 | Deibel | May 10, 1955 |

FOREIGN PATENTS

| | | |
|---|---|---|
| 547,989 | Great Britain | Sept. 21, 1942 |